United States Patent
Dudding et al.

(10) Patent No.: US 9,662,692 B2
(45) Date of Patent: May 30, 2017

(54) LANDFILL AND BERM COMBINATION

(71) Applicant: AWT IP, LLC, Glen Allen, VA (US)

(72) Inventors: Carlton Dudding, Glen Allen, VA (US); Carrie Pendleton, Columbia, MD (US)

(73) Assignee: AWT IP, LLC, Glen Allen, VA (US)

( * ) Notice: Subject to any disclaimer, the term of this patent is extended or adjusted under 35 U.S.C. 154(b) by 0 days.

(21) Appl. No.: 14/262,866

(22) Filed: Apr. 28, 2014

(65) Prior Publication Data
US 2014/0234028 A1 Aug. 21, 2014

Related U.S. Application Data

(63) Continuation of application No. 13/728,621, filed on Dec. 27, 2012, now Pat. No. 8,727,664, which is a (Continued)

(51) Int. Cl.
*E02D 17/04* (2006.01)
*B09B 1/00* (2006.01)
(Continued)

(52) U.S. Cl.
CPC .............. *B09B 1/008* (2013.01); *B09B 1/00* (2013.01); *E02B 11/00* (2013.01); *E02D 31/002* (2013.01)

(58) Field of Classification Search
CPC . E02B 3/127; E02B 7/06; E02D 17/18; E02D 29/02
(Continued)

(56) References Cited

U.S. PATENT DOCUMENTS 3,234,741 A 2/1966 Ionides
3,383,864 A 5/1968 Turzilllo
(Continued)

OTHER PUBLICATIONS

Kevin Robinson, Dayakar Penumadu, Douglas Brown, Nancy Roberts and Willie Liew; A New Large Volume Application for Beneficial Use of Coal Combustion Products in Hydrologically and Environmentally Responsible Engineered Landfill Containment Berms; 6 pages; Aug. 31, 2009.
(Continued)

*Primary Examiner* — Tara M. Pinnock
(74) *Attorney, Agent, or Firm* — Patent Law of Virginia, PLLC; Brian J. Teague

(57) ABSTRACT

A berm to increase capacity of an existing landfill comprises a reinforced portion and backfill material. The landfill comprises a waste-receiving recess having a surface and an outer perimeter, an edge surface peripherally adjacent at least a portion of the outer perimeter, and an existing accumulation of waste within the recess having a collective top surface. The reinforced portion has opposing inner and outer surfaces and comprises structural fill material and a plurality of reinforcing members disposed therein. The backfill material has an inner surface adjacent the inner surface of the reinforced portion. The inner surface of the reinforced portion and the adjacent inner surface of the backfill material are substantially non-planar. The backfill material is at least partially encapsulated by an impermeable membrane. At least a portion of the berm sits on at least a portion of the edge surface of the landfill.

32 Claims, 17 Drawing Sheets

Related U.S. Application Data continuation of application No. 12/636,201, filed on Dec. 11, 2009, now Pat. No. 8,376,657.

(60) Provisional application No. 61/267,593, filed on Dec. 8, 2009.

(51) Int. Cl.
*E02D 31/00* (2006.01)
*E02B 11/00* (2006.01)

(58) Field of Classification Search
USPC .................. 405/258.1, 272, 284, 302.4
See application file for complete search history.

(56) References Cited

U.S. PATENT DOCUMENTS

| | | | |
|---|---|---|---|
| 3,421,326 A | | 1/1969 | Vidal |
| 3,705,851 A | * | 12/1972 | Brauer ................. 210/747.7 |
| 4,050,254 A | | 9/1977 | Meheen |
| 4,117,686 A | | 10/1978 | Hilfiker |
| 4,125,970 A | * | 11/1978 | Vidal ........................ 52/31 |
| 4,166,709 A | | 9/1979 | Valiga |
| 4,268,993 A | * | 5/1981 | Cunningham ....... E01C 13/083 405/37 |
| 4,287,141 A | | 9/1981 | Russell |
| 4,362,434 A | * | 12/1982 | Valiga ................ E02D 31/004 405/129.57 |
| 4,521,131 A | | 6/1985 | Nandlal |
| 4,526,615 A | * | 7/1985 | Johnson .......................... 299/5 |
| 4,555,201 A | | 11/1985 | Paoluccio |
| 4,596,491 A | | 6/1986 | Dietzler |
| 4,655,637 A | | 4/1987 | Vignocchi |
| 4,668,129 A | | 5/1987 | Babcock |
| 4,818,151 A | | 4/1989 | Moreland |
| 4,930,939 A | | 6/1990 | Jaecklin |
| 4,992,003 A | | 2/1991 | Perach |
| 5,044,833 A | | 9/1991 | Wilfiker |
| 5,056,960 A | | 10/1991 | Marienfeld |
| 5,066,169 A | | 11/1991 | Gavin |
| 5,076,735 A | | 12/1991 | Hilfiker |
| 5,139,369 A | | 8/1992 | Jaecklin |
| 5,156,496 A | | 10/1992 | Vidal |
| 5,276,255 A | | 1/1994 | Stark |
| 5,419,659 A | | 5/1995 | Mercer |
| 5,439,318 A | | 8/1995 | Stark |
| 5,522,682 A | | 6/1996 | Egan |
| 5,531,547 A | | 7/1996 | Shimada |
| 5,549,418 A | | 8/1996 | Devine |
| 5,599,139 A | | 2/1997 | Chewning |
| 5,658,096 A | | 8/1997 | Von Kanel |
| 5,707,183 A | | 1/1998 | Akamine |
| 5,836,129 A | | 11/1998 | Jaecklin |
| 5,857,807 A | | 1/1999 | Longo, Sr. |
| 5,948,250 A | | 9/1999 | Middleton |
| 5,961,437 A | | 10/1999 | Smith |
| 6,238,144 B1 | | 5/2001 | Babcock |
| 6,296,422 B1 | | 10/2001 | Ferraiolo |
| 6,443,663 B1 | | 9/2002 | Scales |
| 6,808,339 B2 | | 10/2004 | Peterson |
| 6,824,681 B2 | | 11/2004 | Engwer |
| 6,893,193 B2 | | 5/2005 | Santha |
| 7,029,204 B1 | | 4/2006 | Webber |
| 7,097,390 B1 | | 8/2006 | Moss |
| 7,118,308 B2 | | 10/2006 | Hater |
| 7,147,405 B2 | | 12/2006 | Ferraiolo |
| 7,314,336 B2 | | 1/2008 | Moss |
| 7,399,144 B2 | | 7/2008 | Kallen |
| 7,469,859 B1 | | 12/2008 | Campbell |
| 8,246,274 B1 | | 8/2012 | Hall |
| 2003/0185634 A1 | | 10/2003 | Babcock |
| 2004/0018061 A1 | | 1/2004 | Jansson |
| 2004/0079699 A1 | | 4/2004 | Engwer |
| 2005/0252144 A1 | | 11/2005 | MacDonald |
| 2005/0271478 A1 | | 12/2005 | Ferraiolo |
| 2009/0050025 A1 | | 2/2009 | Wissa |
| 2009/0285640 A1 | | 11/2009 | Hilfiker |

OTHER PUBLICATIONS

Delaware Dept. of Natural Resources and Environmental Control, 'II. Municipal Solid Waste and Landfill Capacity in Delaware,' Nov. 2005, p. 12-58., available at http://www.dnrec.delaware.gov/SWMTWG/Documents/2ac98919f32b4f269b135dfb50-4c3a3aDecember13BackgroundonMSWsituationinDelaware.pdf.
Conservation Approach to Coal Combustion Products Handling, MACTEC, 42 pages, available at http://conservationengineers.org/conferences/2010presentations/CoalConversion_Schmitt.pdf, undated.
Bacher et al., 'Coal Combustion Fly-Ash as Construction Material in a Sanitary Landfill Project,' Oct. 1996, Proceedings of Coal Combustion By-Products Associated with Coal Mining—Interactive Forum, 10 pages.

\* cited by examiner

LANDFILL AND BERM COMBINATION

CROSS-REFERENCE TO RELATED APPLICATIONS

This application is a continuation of and claims priority to pending U.S. application Ser. No. 13/728,621, filed Dec. 27, 2012, which in turn is a continuation of and claims priority to U.S. application Ser. No. 12/636,201, filed Dec. 11, 2009, which in turn claims priority to provisional U.S. Application No. 61/267,593, filed Dec. 8, 2009, the contents of which are incorporated herein by reference in their entirety.

FIELD OF THE INVENTION

The present invention generally relates to construction of containment berms and other embankments and structures.

BACKGROUND OF THE INVENTION

Berms are commonly used in situations where the ability to construct vertically has been constrained by the inability to expand laterally at a slope that allows the desired vertical height to be attained without failure. For example, berms are often used to expand the capacity of landfills that are nearing or have reached their capacity but which do not have space to expand outward. In such situations, berms may be constructed around some or all of the landfill to increase the vertical capacity. Referring now to FIG. 1, a landfill 10 comprises a large waste-receiving recess 12 in the ground 14. The recess has a surface 16 that may or may not have a liner system in place. The waste in the landfill may comprise any material that is typically placed in a landfill, such as residential trash, construction debris, hazardous waste and/or yard waste. The recess is surrounded by an edge 18. The edge is typically substantially horizontal, but may alternatively be substantially sloped. As seen in FIG. 1, the existing accumulation of waste 20 has filled the recess 12. However, the capacity of the landfill can be increased by constructing a berm on the edge 18.

Berms often comprise a reinforced portion and backfill material. The reinforced portion comprises structural fill material with reinforcing members disposed (typically substantially horizontally) therein. These berms allow for the desired vertical height in a limited space. These berms are very expensive to construct, however, on a relative basis, as material with very tight specifications must be acquired and transported and the cost of the reinforcement itself can be prohibitive in many circumstances. Therefore what is needed is a method to construct these berms that allows for economical construction and that utilizes material that can generate the revenue necessary to cover the bulk of the cost of the entire berm while being environmentally sound and regulatory agency acceptable.

BRIEF SUMMARY OF THE INVENTION

In one embodiment of the invention, a berm to increase capacity of an existing landfill comprises a reinforced portion and backfill material. The landfill comprises a waste-receiving recess having a surface and an outer perimeter, an edge surface peripherally adjacent at least a portion of the outer perimeter, and an existing accumulation of waste within the recess having a collective top surface. The reinforced portion has opposing inner and outer surfaces and comprises structural fill material and a plurality of reinforcing members disposed therein. The backfill material has an inner surface adjacent the inner surface of the reinforced portion. The inner surface of the reinforced portion and the adjacent inner surface of the backfill material are substantially non-planar. The inner surface of the reinforced portion and the adjacent inner surface of the backfill material each comprise a plurality of interlocking sections. The backfill material is at least partially encapsulated by an impermeable membrane. At least a portion of the berm sits on at least a portion of the edge surface of the landfill.

The backfill material may comprise contaminated fill material. The contaminated fill material may comprise one or more of fossil fuel combustion product, fly ash, bottom ash, boiler slag, flue gas desulphurization material, nonhazardous contaminated soil, contaminated crushed glass, contaminated crushed concrete, contaminated crushed asphalt, sand blast grit, foundry sand, de-watered dredge spoils, or combinations thereof. The contaminated fill material may be contaminated with one or more of a metal, an acid, a base, a volatile organic compound, a semi-volatile organic compound, a petroleum product, selenium, mercury, lead, boron, cadmium, thallium, a polycyclic aromatic hydrocarbons compound, or combinations thereof.

The impermeable membrane may comprise a geomembrane. The geomembrane may comprise one of low-density polyethylene (LDPE), high-density polyethylene (HDPE), polyvinyl chloride (PVC), polyurea or polypropylene (PP).

The impermeable membrane may comprise a plurality of impermeable membrane sections joined with impermeable seams. The plurality of impermeable membrane sections may be joined using extrusion welding or other suitable welding method such as fusion welding.

Any unencapsulated portion of the backfill material may be adjacent the existing accumulation of waste.

The backfill material may be fully encapsulated. In such an embodiment, the berm may further comprise a drainage system within the impermeable membrane. The drainage system may comprise a perforated pipe surrounded by a granular fill material. The drainage system may further comprise a plurality of drainage pipes each leading from the perforated pipe to an area outside of the berm. Each of the plurality of drainage pipes may exit the impermeable membrane through a corresponding boot that is joined to the impermeable membrane and to the corresponding drainage pipe with impermeable seams. The berm may further comprise a drainage layer adjacent an inner surface of the impermeable membrane and contacting the drainage system. The drainage layer may comprise a geocomposite.

The backfill material may further comprise opposing top and bottom surfaces, and upper and lower sloped outer surfaces. The lower sloped outer surface slopes outward and upward from the bottom surface to the upper sloped outer surface. The upper sloped outer surface slopes outward and downward from the top surface to the lower sloped outer surface. The lower sloped outer surface is adjacent the existing accumulation of waste, and the upper sloped outer surface is adjacent a future accumulation of waste. In such an embodiment, the berm may further comprise a first liner portion disposed between the bottom surface and at least a portion of the edge surface and a second liner portion disposed between the upper sloped outer surface and the future accumulation of waste. The berm may further comprise a third liner portion disposed between the lower sloped outer surface and the existing accumulation of waste.

The backfill material may further comprise opposing top and bottom surfaces, and a sloped outer surface. The sloped outer surface slopes outward and downward from the top surface to the bottom surface. The sloped outer surface is adjacent a future accumulation of waste. In such an embodiment, the berm may further comprise a first liner portion disposed between the bottom surface and at least a portion of the edge surface and a second liner portion disposed between the sloped outer surface and the future accumulation of waste.

The plurality of interlocking sections may have a zigzag configuration.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
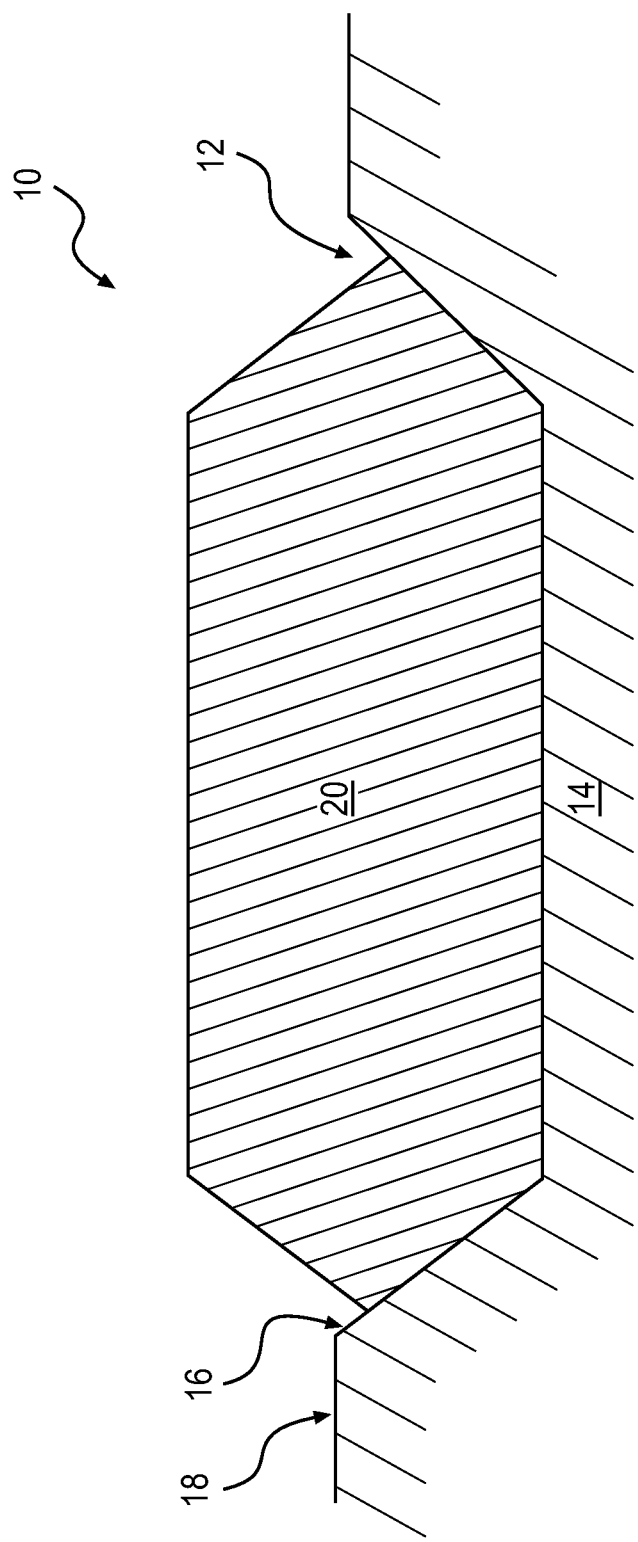
FIG. 1 is a simplified cross-sectional diagram of a prior art landfill that would benefit from embodiments of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The combustion of coal or wood in coal or wood fired power plants produces several materials, including: fly ash, bottom ash, boiler slag, and flue gas desulphurization (FGD) material. Together, these materials represent what is generally referred to as ash or sometimes as FFCPs—Fossil Fuel Combustion Products. These materials are well-documented sources of heavy metal contamination in air, water and on land. Contaminants include selenium, mercury, lead, boron, cadmium, thallium, polycyclic aromatic hydrocarbons compounds, etc. There is an increased awareness and concern regarding the long term health effects of these materials on both humans and the environment as these contaminants can become mobile if not sequestered properly.

FFCPs generally are a very good material suitable for utilization in embankments, re-enforced embankments, walls, berms, roadways, etc. as they tend to be coarse in nature and offer superior shear strength, possess a high friction angle, and have high bearing capacity. Currently, approximately 53 million tons/year of the 130 million tons/year of FFCPs produced are beneficially used in structural, concrete, wall board and other applications. Upcoming regulatory changes will require that FFCPs be treated as contaminated waste, thereby eliminating many of the uses and producing a pronounced strain on the economy. Additionally, landfill capacity across the United Sates will be severely stressed to handle the increased demand for simply disposing of these FFCPs. The utilization of FFCPs and other contaminated materials in embodiments of the present invention will offer a suitable, environmentally-, regulatory- and financially-sound alternative use of these types of materials.

In addition, during the development and use of land for many commercial, agricultural, industrial and other purposes, non-hazardous contaminated soils and media (concrete, asphalt, etc.) are created. These materials can be contaminated with metals, acids, bases, volatile and semi-volatile organic compounds, petroleum products, and a host of other contaminates. These materials are well documented sources of contamination in air, water and on land. There is an ongoing and increased awareness and concern of the long term health effects of these materials on both humans and the environment as these elements can become mobile if not sequestered properly as well. These materials, although tainted, are nonetheless valuable for certain beneficial uses, including as a fill material in reinforced embankment applications.

The materials (FFCPs and contaminated soils) used in embodiments of the invention encompass a very broad entire spectrum of soil and material types and could be characterized as fine grained, coarse grained, homogeneous, non-homogeneous, etc. However characterized, in the embodiments described herein, the material available can be used to construct berms for landfill expansion, roadway and berm construction and are readily available in most locations.

A berm according to embodiments of the present invention may be used to expand the capacity of a landfill. Such a berm is typically constructed on at least a portion of the upper, outer edge (18 of FIG. 1) of a landfill. Such a berm raises the height of the exterior walls of a landfill, thereby enlarging the waste-receiving recess (12 of FIG. 1). Such a berm may be of any suitable height, commonly about thirty to eighty feet tall. Such a berm may be of any suitable length, commonly hundreds or even thousands of feet long. At least a portion of such a berm would sit on at least a portion of the edge surface of the landfill, and the berm is substantially parallel to corresponding portions of the outer perimeter. Alternatively, a berm according to embodiments of the present invention may be used to create a new landfill by constructing one or more such berms around the desired perimeter of the new landfill. In such an alternative embodiment, the one or more berms define and create the waste-receiving recess of the landfill.

Figure 2:
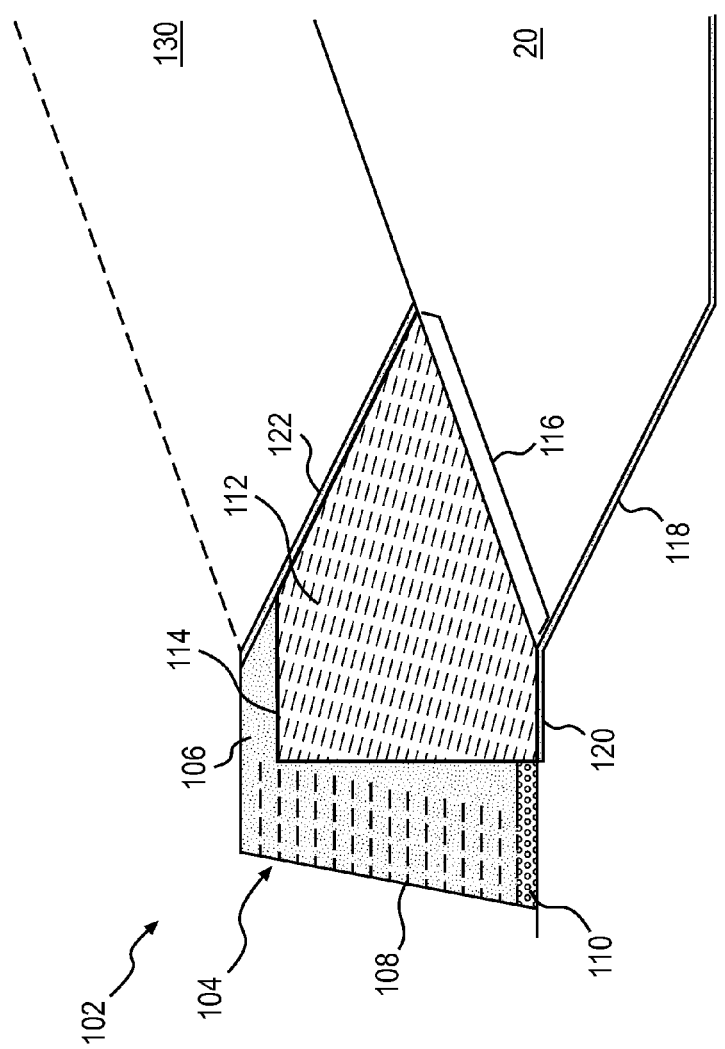
FIG. 2 is a simplified cross-sectional diagram of a berm for increasing the capacity of an existing landfill, in accordance with one embodiment of the present invention.

Referring now to FIG. 2, a simplified cross-sectional diagram of a berm for increasing the capacity of an existing landfill is illustrated in accordance with one embodiment of the present invention. The berm 102 of FIG. 2 comprises a reinforced portion 104 and backfill material 112. The reinforced portion 104 is constructed using typical construction techniques and comprises structural fill material 106 and a plurality of reinforcing members 108 disposed (typically horizontally) therein. The reinforced portion may have a foundation of granular fill material 110. As seen in FIG. 2, the reinforced portion has opposing inner and outer surfaces. The outer surface is commonly termed the "face" of the wall and the inner surface is adjacent the backfill material. The reinforced portion may optionally have facing material covering the face of the reinforced portion. The facing material, if present, is typically attached to or integral with the reinforcing members. The structural fill typically comprises relatively homogeneous soils that are relatively free of debris, foreign objects, excess silt, roots, and organics. The granular fill is typically well graded sand, well graded sand and gravel, crushed stone, or other approved granular material.

The backfill material 112 comprises contaminated fill material. The contaminated fill material can be any suitable waste product that has the desired coarseness, shear strength, high friction angle, and high bearing capacity. The contaminated fill material should be non-hazardous, but is nonetheless expensive to properly dispose of. The contaminated fill material may comprise FFCPs, non-hazardous contaminated soils, contaminated crushed glass, contaminated crushed concrete, contaminated crushed asphalt, sand blast grit, foundry sands, properly de-watered dredge spoils, and combinations of these materials. Importantly, the backfill material is at least partially encapsulated by an impermeable membrane 114. FIG. 2 illustrates a berm with a partially encapsulated backfill. In the embodiment of FIG. 2, the portion 116 of the backfill material adjacent the existing waste accumulation is not covered by an impermeable membrane.

The impermeable membrane is, when intact, impermeable to fluids and/or gases. The impermeable membrane used in embodiments of the invention may comprise a geomembrane. The geomembrane may comprise one of low-density polyethylene (LDPE), high-density polyethylene (HDPE), polyvinyl chloride (PVC), polyurea or polypropylene (PP). Because of the potentially large size of such a berm and the limited size of commercially available geomembranes, the impermeable membrane may comprise a plurality of impermeable membrane sections joined with impermeable seams. The plurality of impermeable membrane sections are typically joined using any desirable method of joining such material, including but not limited to extrusion welding, fusion welding, and/or gluing (especially for PVC or PP).

Figure 3:
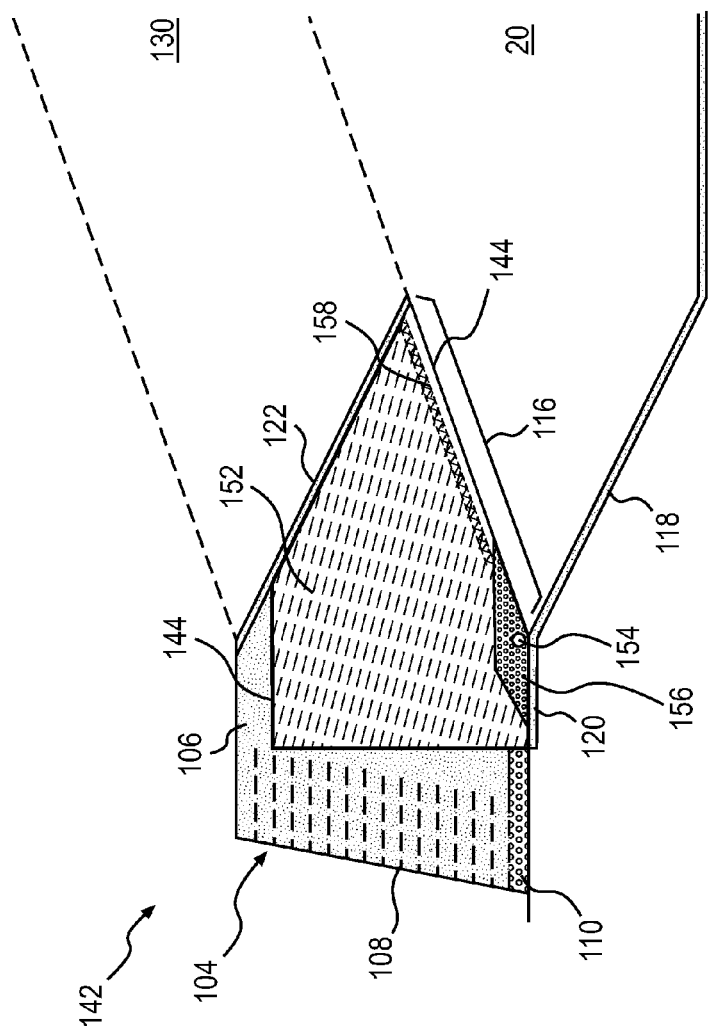
FIG. 3 is a simplified cross-sectional diagram of a berm for increasing the capacity of an existing landfill, in accordance with an alternative embodiment of the present invention.
Figure 4:
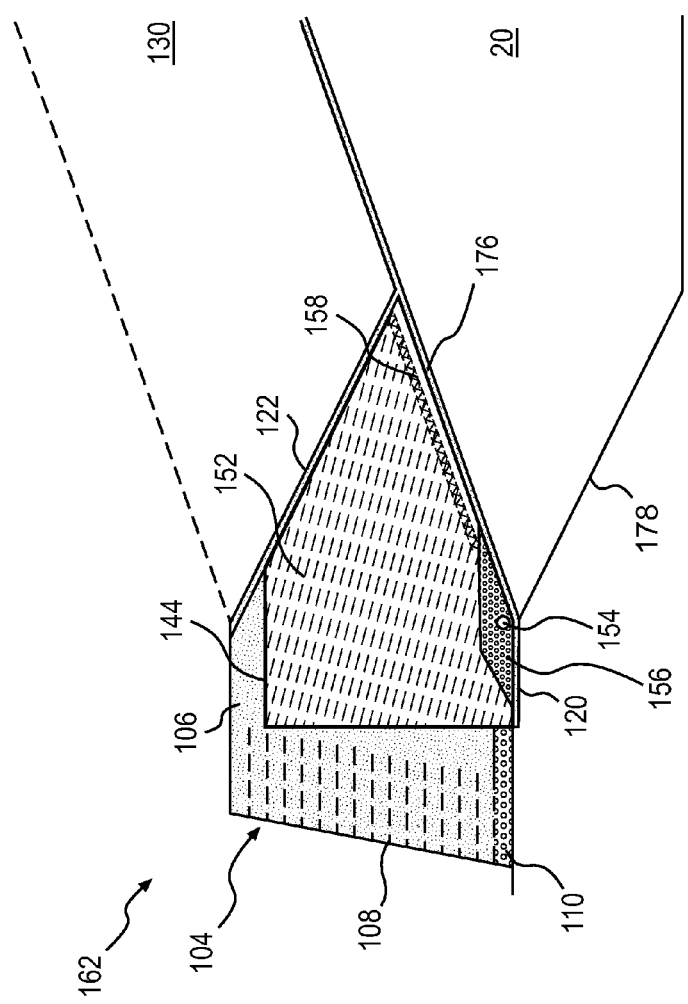
FIG. 4 is a simplified cross-sectional diagram of a berm for increasing the capacity of an existing landfill, in accordance with an alternative embodiment of the present invention.

In the embodiments illustrated in FIGS. 2-4, the backfill material has an inner surface adjacent the inner surface of the reinforced portion, opposing top and bottom surfaces, and upper and lower sloped outer surfaces. The lower sloped outer surface slopes outward and upward from the bottom surface to the upper sloped outer surface. The upper sloped outer surface slopes outward and downward from the top surface to the lower sloped outer surface. The lower sloped outer surface is adjacent the existing accumulation of waste 20 (the lower sloped outer surface sits on at least a portion of the existing accumulation of waste), and the upper sloped outer surface is adjacent a future accumulation of waste 130 (at least a portion of the future accumulation of waste sits on the upper sloped outer surface). In the embodiments of FIGS. 2-3, a first liner portion 120 is disposed between the bottom surface and at least a portion of the edge surface and a second liner portion 122 is optionally disposed between the upper sloped outer surface and the future accumulation of waste 130. The liner portion disposed between the existing accumulation of waste 20 and the future accumulation of waste 130 is optional. The first and second liner portions will typically conform to Subtitle D of the Resource Conservation and Recovery Act (RCRA) or conform to an approved equivalent of Subtitle D of RCRA (described in further detail below). If the first and/or second liner portions comprise a Subtitle D or equivalent liner that has a geomembrane layer, the geomembrane that encapsulates the backfill material may function additionally as the geomembrane layer of the Subtitle D or equivalent liner. In other words, the geomembrane that encapsulates the backfill may perform double duty in that the geomembrane functions both as the encapsulating material and as a layer of the Subtitle D or equivalent liner.

In some embodiments of the invention, the Subtitle D or equivalent liner may be omitted and a geomembrane by itself used in place of the Subtitle D or equivalent liner if permitted by the appropriate governmental authorities. Advantageously, if a geomembrane is permitted to be used in place of the Subtitle D or equivalent liner, the geomembrane 114 that partially or fully encapsulates the backfill material will function as the replacement for the Subtitle D or equivalent liner and no additional liner is necessary (as above, the encapsulating geomembrane is performing two functions). The landfill of FIGS. 2 and 3 has a Subtitle D or equivalent liner 118 covering the surface of the waste-receiving recess, although embodiments of the invention may be used with a landfill that has no liner system in place.

Referring now to FIG. 3, a simplified cross-sectional diagram of a berm for increasing the capacity of an existing landfill is illustrated in accordance with an alternative embodiment of the present invention. The berm 142 of FIG. 3 comprises a reinforced portion 104 and backfill material 152. The reinforced portion 104 of FIG. 3 is identical to that of FIG. 2. The backfill material 152 is similar to that of FIG. 2 in that it comprises contaminated fill material, such as FFCPs or contaminated but non-hazardous soil. However, the backfill material of FIG. 3 is fully encapsulated by an impermeable membrane 144. Unlike the berm of FIG. 2, the portion 116 of the backfill material adjacent the existing waste accumulation is covered by an impermeable membrane 144 in FIG. 3.

Depending on the nature of the backfill material, it may be desirable to keep water from reaching the backfill material. This is why an impermeable membrane is used. However, liquid may be released from the backfill after placement. Therefore, it may be desirable to have an optional drainage system (commonly termed a "toe drain") within the encapsulation to drain away any water that is released from the backfill. The drainage system of FIG. 3 comprises a perforated pipe 154 running along at least a portion of the length of the berm. The pipe 154 is surrounded by a granular fill material 156. An optional plurality of drainage pipes (not illustrated) may each lead substantially perpendicularly from the perforated pipe to an area outside of the berm. The drainage pipes may either lead toward the face of the reinforced portion and exit the berm through the reinforced portion, or may lead toward the waste and exit the berm into the waste. The drainage pipes may ultimately lead to a collection tank for later management or may discharge into the landfill's leachate collection and treatment system. Each of the plurality of drainage pipes typically pass through the impermeable membrane via a corresponding boot that is joined to the impermeable membrane and to the corresponding drainage pipe with impermeable seams. A drainage layer 158 may be adjacent the inside surface of the lower sloped outer surface of the impermeable membrane, terminating on one side within the granular fill material. The drainage layer, which may comprise a geocomposite, helps channel any water toward the granular fill and the perforated pipe. The drainage system is an optional feature of all of the illustrated embodiments of the invention. The drainage system may vary significantly depending on the requirements of the specific implementation of the invention. For example, the drainage system may omit the plurality of drainage pipes. In such an embodiment, the perforated pipe may drain into a gravel conduit which may extend downward into the landfill.

Referring now to FIG. 4, a simplified cross-sectional diagram of a berm for increasing the capacity of an existing landfill is illustrated in accordance with an alternative embodiment of the present invention. The berm 162 of FIG. 4 is nearly identical to that of FIG. 3. However, the berm of FIG. 4 is illustrated being used with an existing unlined landfill, i.e., a landfill in which the surface 178 of the waste-receiving recess is not lined with a Subtitle D or equivalent liner. Additionally, a third liner portion 176 is disposed between the lower sloped outer surface and the existing accumulation of waste 20. The third liner portion may conform to Subtitle D of RCRA or conform to an approved equivalent of Subtitle D of RCRA. The landfill of FIG. 4 also has a Subtitle D or equivalent liner between the existing accumulation of waste 20 and the future accumulation of waste 130. As discussed above, if the liner portion comprises a Subtitle D or equivalent liner that has a geomembrane layer, the geomembrane that encapsulates the backfill material may function additionally as the geomembrane layer of the liner.

The first, second and/or third liner portions illustrated in the various figures are all optional. Embodiments of the present invention do not require and will not necessarily have or be used with a Subtitle D or equivalent liner.

Figure 5:
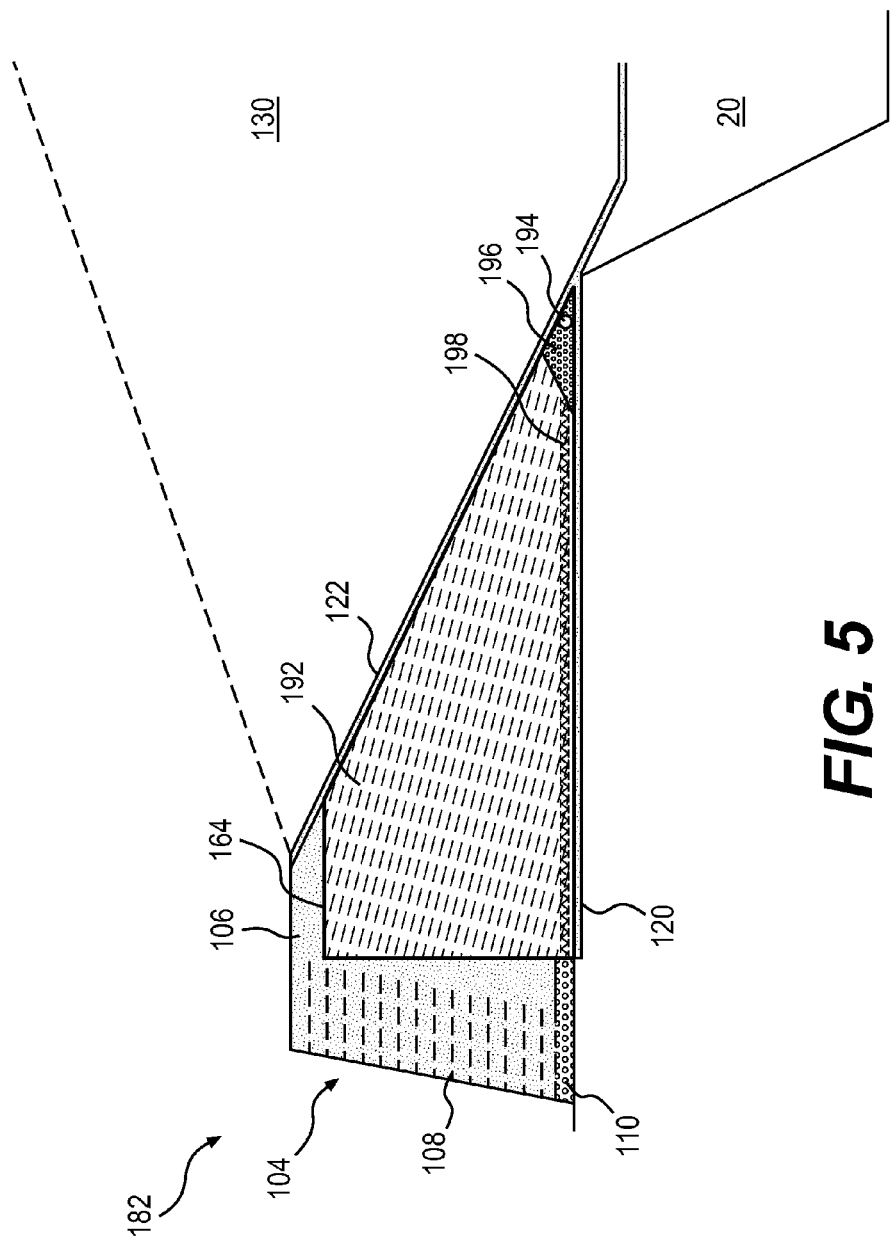
FIG. 5 is a simplified cross-sectional diagram of a berm for increasing the capacity of an existing landfill, in accordance with an alternative embodiment of the present invention.

Referring now to FIG. 5, a simplified cross-sectional diagram of a berm for increasing the capacity of an existing landfill is illustrated in accordance with an alternative embodiment of the present invention. The berm 182 of FIG. 2 comprises a reinforced portion 104 and backfill material 192. The reinforced portion 104 is identical to those of FIGS. 1-4. The backfill material 192 is similar to that of FIGS. 1-4 but with a different cross-sectional shape. The backfill material 192 of FIG. 5 is fully encapsulated by an impermeable membrane 164. As seen in FIG. 5, the berm 182 sits completely on the outer edge of the landfill and no part of the berm extends over the existing accumulation of waste 20.

The backfill material 192 of berm 182 comprises opposing top and bottom surfaces, and a sloped outer surface. The sloped outer surface slopes outward and downward from the top surface to the bottom surface. The sloped outer surface is adjacent a future accumulation of waste 130. In the embodiment of FIG. 5, a first liner portion 120 is disposed between the bottom surface and at least a portion of the edge surface and a second liner portion 122 is disposed between the sloped outer surface and the future accumulation of waste. The first and second liner portions, which are optional, may conform to Subtitle D of RCRA or conform to an approved equivalent of Subtitle D of RCRA.

The berm of FIG. 5 includes a drainage system which comprises a perforated pipe 194, running along at least a portion of the length of the berm. The pipe 194 is surrounded by a granular fill material 196. An optional plurality of drainage pipes (not illustrated) may each lead substantially perpendicularly from the perforated pipe toward the face and to an area outside of the berm. A drainage layer 198 is adjacent the inside surface of the bottom surface of the impermeable membrane, terminating on one side within the granular fill material. The drainage layer, which may comprise a geocomposite, helps channel any water toward the granular fill and the perforated pipe. In the embodiment of FIG. 5, the edge surface of the landfill on which the berm sits may be slightly sloped downward toward the waste-receiving recess to help facilitate the flow of any water toward the drainage system.

Figure 6:
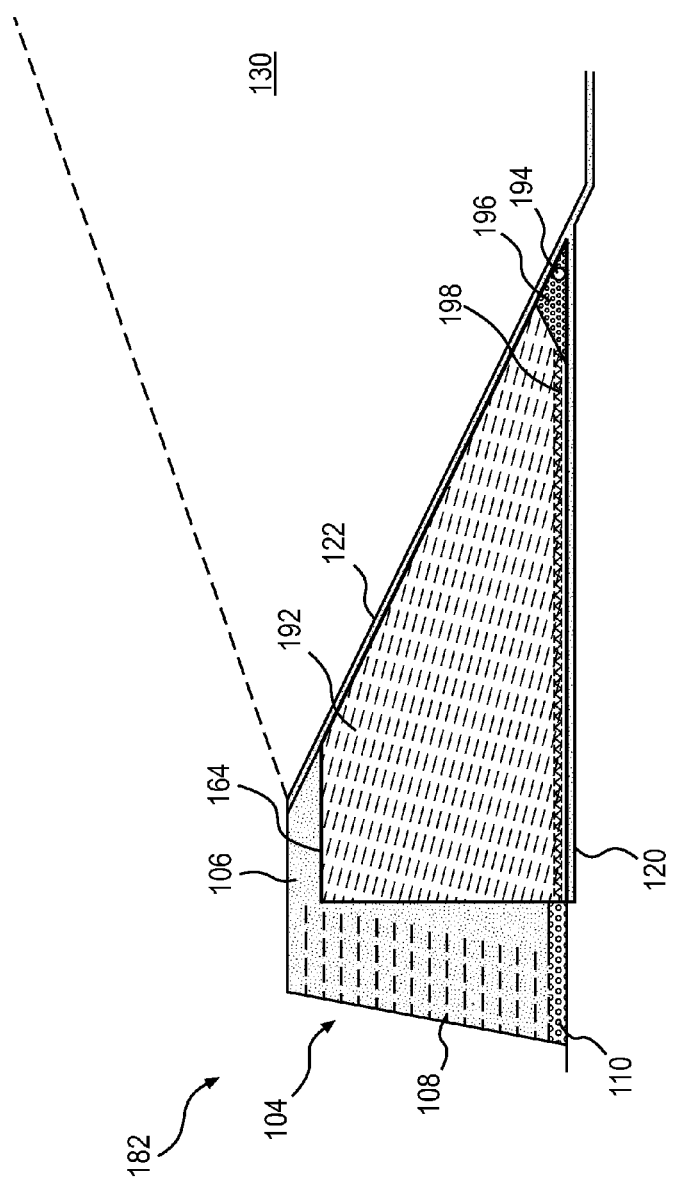
FIG. 6 is a simplified cross-sectional diagram of a berm for creating a new landfill or laterally increasing the capacity of an existing landfill, in accordance with an alternative embodiment of the present invention.

Referring now to FIG. 6, a simplified cross-sectional diagram of a berm for creating a new landfill or laterally increasing the capacity of an existing landfill is illustrated in accordance with an alternative embodiment of the present invention. The berm 182 of FIG. 6 is identical to that of FIG. 5, except that the berm 182 of FIG. 6 is not adjacent an existing accumulation of waste. Therefore, the berm of FIG. 6 may be used to create an entirely new landfill space—not expanding the capacity of existing landfill. Alternatively, the berm of FIG. 6 may be used to laterally increase the capacity of an existing landfill. In such an alternative use, the berm is situated laterally apart from the existing accumulation of waste, thereby enabling a new accumulation of waste to be placed between the berm and the existing accumulation of waste. Thus, the berm of FIG. 6 does not abut or surround any existing waste. The berm of FIG. 6 is situated to abut or surround a space at which a desired new landfill is to be located. The berm of FIG. 6 is used to create the waste-receiving recess into which a future accumulation of waste 130 is to be placed.

In embodiments of the invention illustrated in FIGS. 1-6, the inner surface of the reinforced portion and the adjacent inner surface of the backfill material are substantially planar. In alternative embodiments of the invention, illustrated in FIGS. 7-12, the inner surface of the reinforced portion and the adjacent inner surface of the backfill material are substantially non-planar. In such embodiments, the inner surface of the reinforced portion and the adjacent inner surface of the backfill material each comprise a plurality of interlocking sections, such as the zigzag configuration illustrated in FIGS. 7-12. The non-planar interlocking sections help facilitate construction of the berm.

Figure 7:
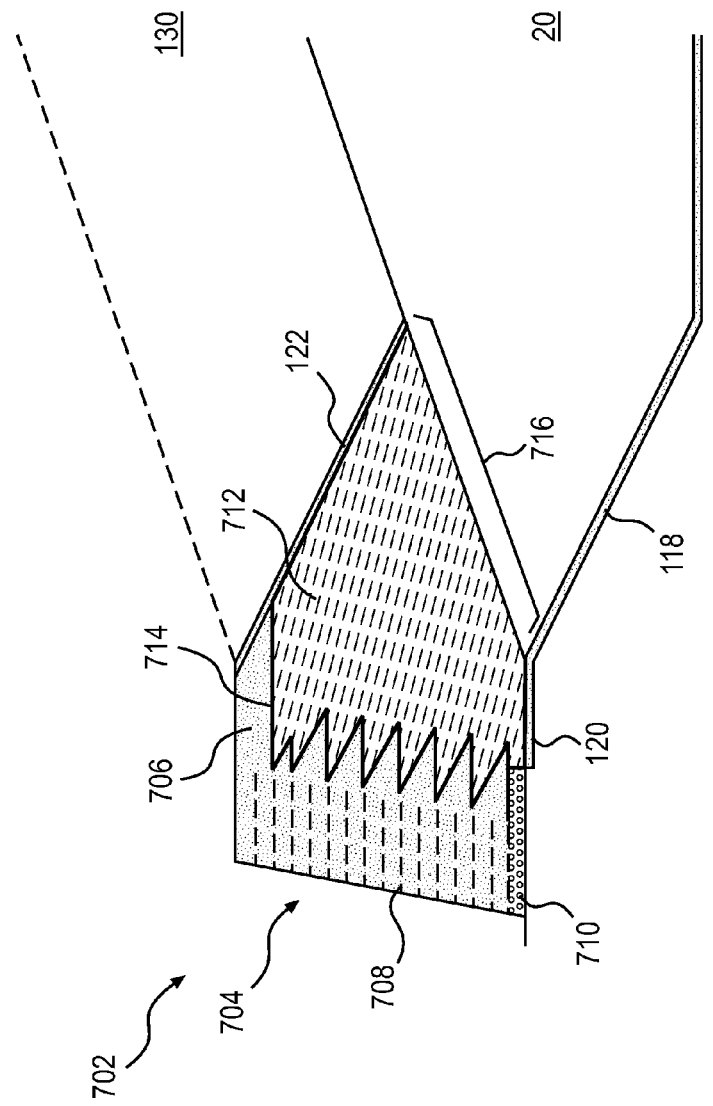
FIG. 7 is a simplified cross-sectional diagram of a berm for increasing the capacity of an existing landfill, in accordance with an alternative embodiment of the present invention.

Referring now to FIG. 7, a simplified cross-sectional diagram of a berm for increasing the capacity of an existing landfill is illustrated in accordance with an alternative embodiment of the present invention. The berm 702 of FIG. 7 is similar to the berm 102 of FIG. 2. However, in the berm 702 of FIG. 7, the inner surface of the reinforced portion and the adjacent inner surface of the backfill material each comprise a plurality of interlocking sections in a zigzag configuration. Berm 702 comprises a reinforced portion 704 and backfill material 712. The reinforced portion 704 is constructed using typical construction techniques and comprises structural fill material 706 and a plurality of reinforcing members 708 disposed therein. The reinforced portion may have a foundation of granular fill material 710. The backfill material 712 comprises contaminated fill material that is partially encapsulated by an impermeable membrane 714. In the embodiment of FIG. 7, the portion 716 of the backfill material adjacent the existing waste accumulation is not covered by an impermeable membrane. As in the berm of FIG. 2, the berm 702 has a lower sloped outer surface adjacent the existing accumulation of waste 20 (the lower sloped outer surface sits on at least a portion of the existing accumulation of waste), and a upper sloped outer surface adjacent a future accumulation of waste 130 (at least a portion of the future accumulation of waste sits on the upper sloped outer surface). Also, a liner portion 120 is disposed between the bottom surface and at least a portion of the edge surface and a second liner portion 122 is disposed between the upper sloped outer surface and the future accumulation of waste 130. Liner 118 covers the surface of the waste-receiving recess.

Figure 8:
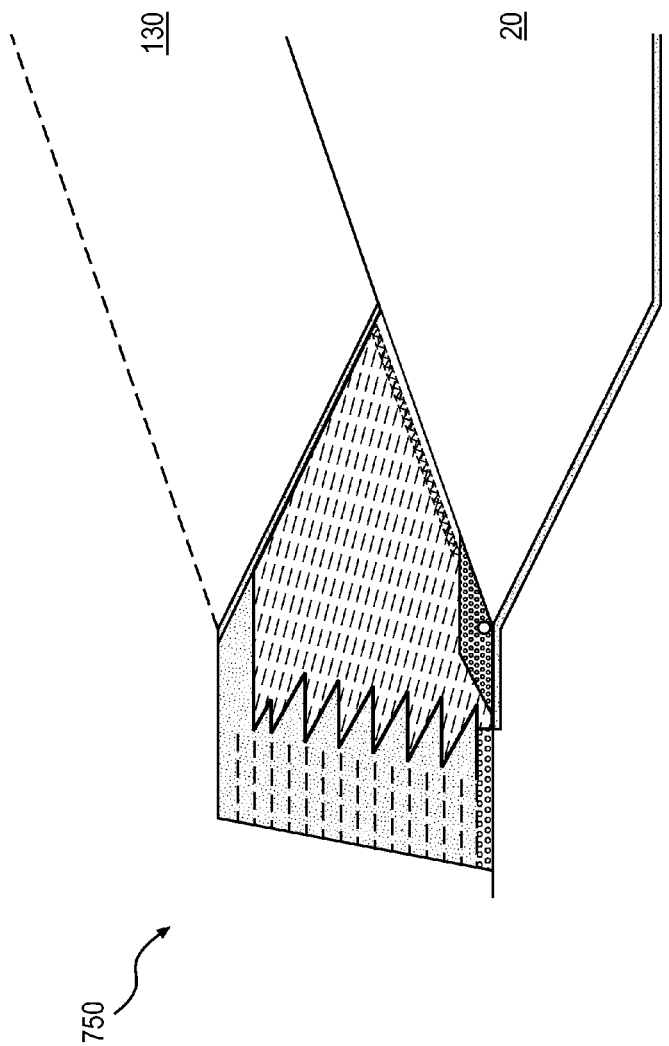
FIG. 8 is a simplified cross-sectional diagram of a berm for increasing the capacity of an existing landfill, in accordance with an alternative embodiment of the present invention.

Referring now to FIG. 8, a simplified cross-sectional diagram of a berm for increasing the capacity of an existing landfill is illustrated in accordance with an alternative embodiment of the present invention. The berm 750 of FIG. 8 is similar to the berm 142 of FIG. 3. However, in the berm 750 of FIG. 8, the inner surface of the reinforced portion and the adjacent inner surface of the backfill material each comprise a plurality of interlocking sections in a zigzag configuration. Other than the zigzag configuration of the inner surface of the reinforced portion and the adjacent inner surface of the backfill material, all other components of berm 750 of FIG. 8 are the same as the corresponding components of berm 142 of FIG. 3.

Figure 9:
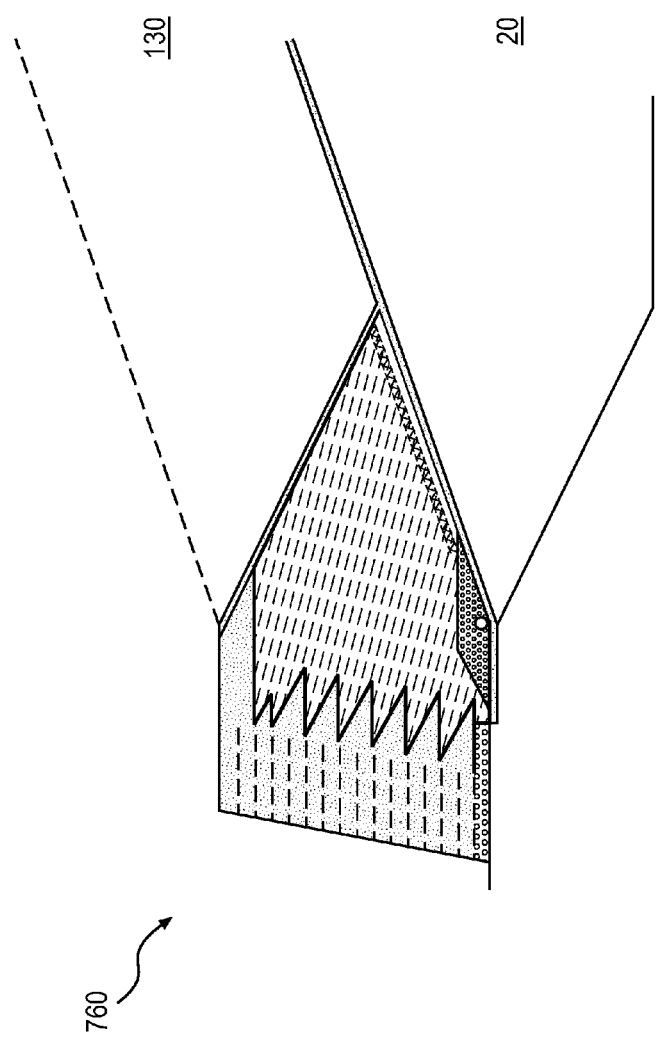
FIG. 9 is a simplified cross-sectional diagram of a berm for increasing the capacity of an existing landfill, in accordance with an alternative embodiment of the present invention.

Referring now to FIG. 9, a simplified cross-sectional diagram of a berm for increasing the capacity of an existing landfill is illustrated in accordance with an alternative embodiment of the present invention. The berm 760 of FIG. 9 is similar to the berm 162 of FIG. 4. However, in the berm 760 of FIG. 9, the inner surface of the reinforced portion and the adjacent inner surface of the backfill material each comprise a plurality of interlocking sections in a zigzag configuration. Other than the zigzag configuration of the inner surface of the reinforced portion and the adjacent inner surface of the backfill material, all other components of berm 760 of FIG. 9 are the same as the corresponding components of berm 162 of FIG. 4.

Figure 10:
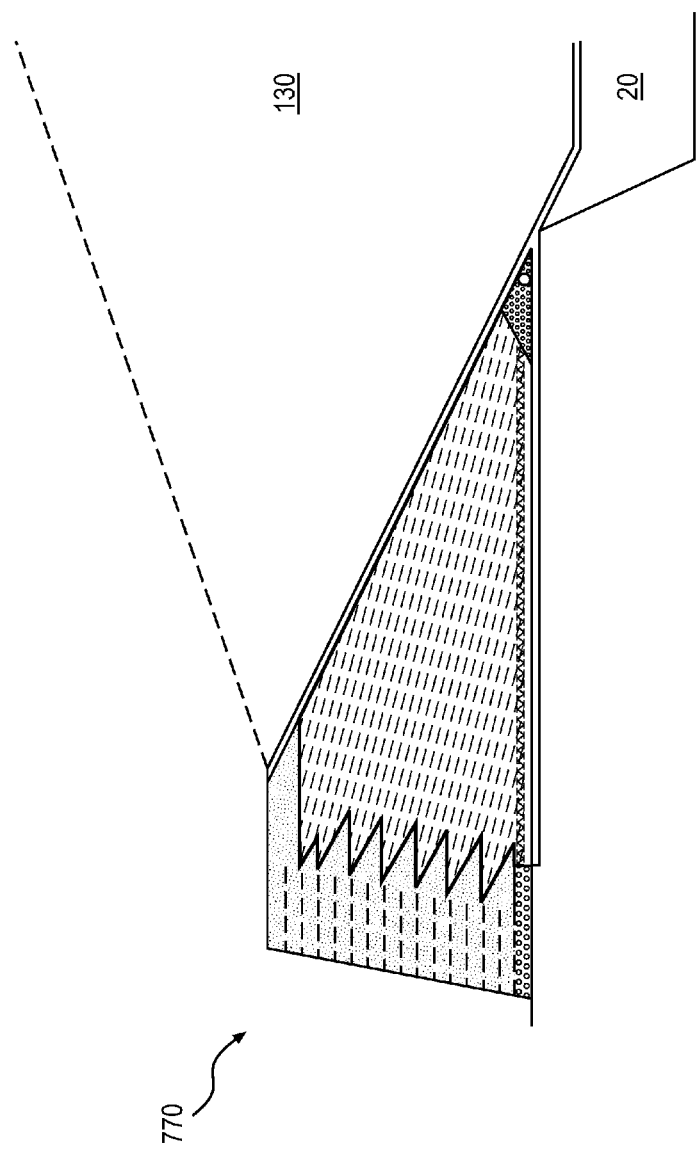
FIG. 10 is a simplified cross-sectional diagram of a berm for increasing the capacity of an existing landfill, in accordance with an alternative embodiment of the present invention.

Referring now to FIG. 10, a simplified cross-sectional diagram of a berm for increasing the capacity of an existing landfill is illustrated in accordance with an alternative embodiment of the present invention. The berm 770 of FIG. 10 is similar to the berm 182 of FIG. 5. However, in the berm 770 of FIG. 10, the inner surface of the reinforced portion and the adjacent inner surface of the backfill material each comprise a plurality of interlocking sections in a zigzag configuration. Other than the zigzag configuration of the inner surface of the reinforced portion and the adjacent inner surface of the backfill material, all other components of berm 770 of FIG. 10 are the same as the corresponding components of berm 182 of FIG. 5.

Figure 11:
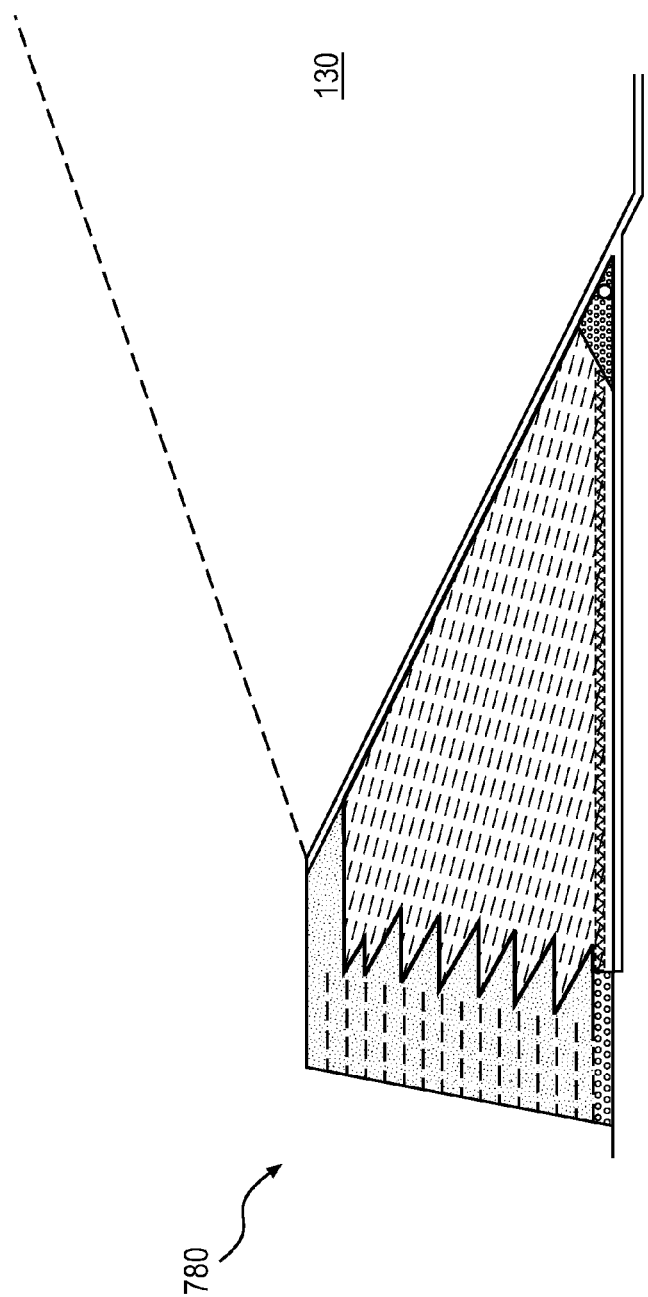
FIG. 11 is a simplified cross-sectional diagram of a berm for creating a landfill or laterally increasing the capacity of an existing landfill, in accordance with an alternative embodiment of the present invention.

Referring now to FIG. 11, a simplified cross-sectional diagram of a berm for creating a new landfill or laterally increasing the capacity of an existing landfill is illustrated in accordance with an alternative embodiment of the present invention. The berm 780 of FIG. 11 is similar to the berm 182 of FIG. 6. However, in the berm 780 of FIG. 11, the inner surface of the reinforced portion and the adjacent inner surface of the backfill material each comprise a plurality of interlocking sections in a zigzag configuration. Other than the zigzag configuration of the inner surface of the reinforced portion and the adjacent inner surface of the backfill material, all other components of berm 780 of FIG. 11 are the same as the corresponding components of berm 182 of FIG. 6.

Figure 12:
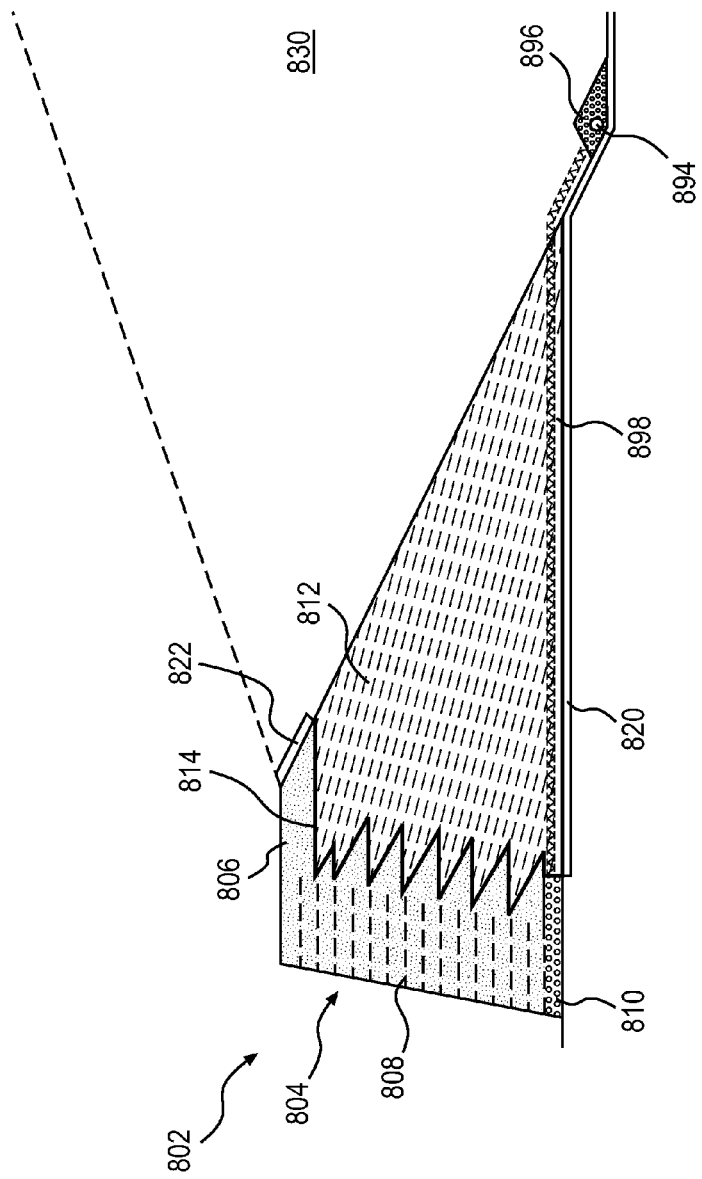
FIG. 12 is a simplified cross-sectional diagram of a berm for creating a landfill, in accordance with an alternative embodiment of the present invention.

Referring now to FIG. 12, a simplified cross-sectional diagram of a berm for increasing the capacity of an existing landfill or creating a new landfill is illustrated in accordance with an alternative embodiment of the present invention. Berm 802 of FIG. 12 is similar to berm 182 of FIG. 6, in that the berm of FIG. 12 is illustrated creating an entirely new landfill space—not expanding the capacity of existing landfill. The berm of FIG. 12 does not abut or surround any existing waste. The berm of FIG. 12 is situated to abut or surround a space at which a desired new landfill is to be located. The berm of FIG. 12 is used to create the waste-receiving recess into which a future accumulation of waste 830 is to be placed. Berm 802 of FIG. 12 will be particularly useful for expansion or creation of a landfill in which the waste 830 is FFCPs. In such a FFCP landfill, the backfill material 812 may comprise the same waste material as is disposed of in the landfill. Berm 802 comprises a reinforced portion 804 and backfill material 812. The reinforced portion 804 is constructed using typical construction techniques and comprises structural fill material 806 and a plurality of reinforcing members 808 disposed therein. The reinforced portion may have a foundation of granular fill material 810. The backfill material 812 comprises contaminated fill material that is partially encapsulated by an impermeable membrane 814. In the embodiment of FIG. 12, the portion of the backfill material adjacent the waste accumulation 830 is not covered by an impermeable membrane. As in the berm of FIG. 6, the berm 802 has a sloped outer surface adjacent a future accumulation of waste 830. Also, a liner portion 820 is disposed between the bottom surface and at least a portion of the edge surface and the liner portion 820 also covers the surface of the waste-receiving recess. A liner portion 822 may be disposed between the future accumulation of waste 830 and the reinforced portion 804. Liner portion 820 and liner portion 822 may be a subtitle D liner or equivalent thereof. A drainage system is situated partially within the berm of FIG. 12 and partially within the landfill recess. The drainage system comprises a perforated pipe 894, running along a low point of the landfill recess. The pipe 894 is surrounded by a granular fill material 896. In this embodiment, the portion of the drainage system within the landfill recess may comprise the landfill leachate collection system A drainage layer 898 is partially within the backfill material (adjacent the inside surface of the bottom surface of the impermeable membrane) and partially within the landfill recess, terminating on one side within the granular fill material. The drainage layer, which may comprise a geocomposite, helps channel any water toward the granular fill and the perforated pipe.

Figure 13:
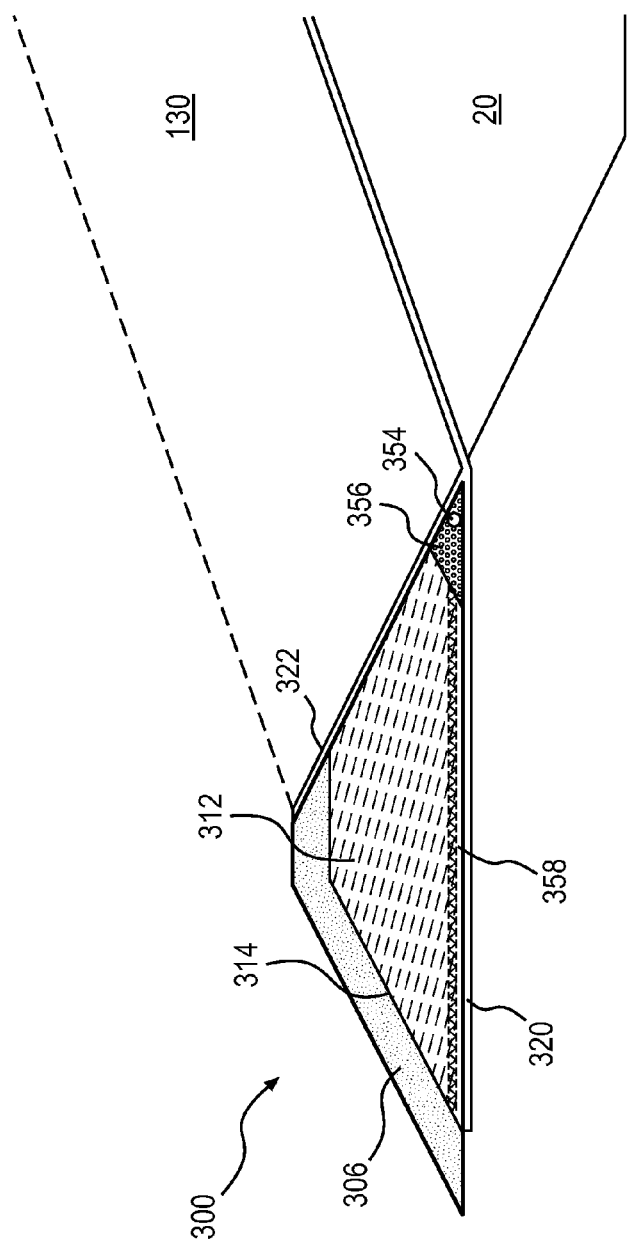
FIG. 13 is a simplified cross-sectional diagram of a berm for increasing the capacity of an existing landfill, in accordance with an alternative embodiment of the present invention.
Figure 14:
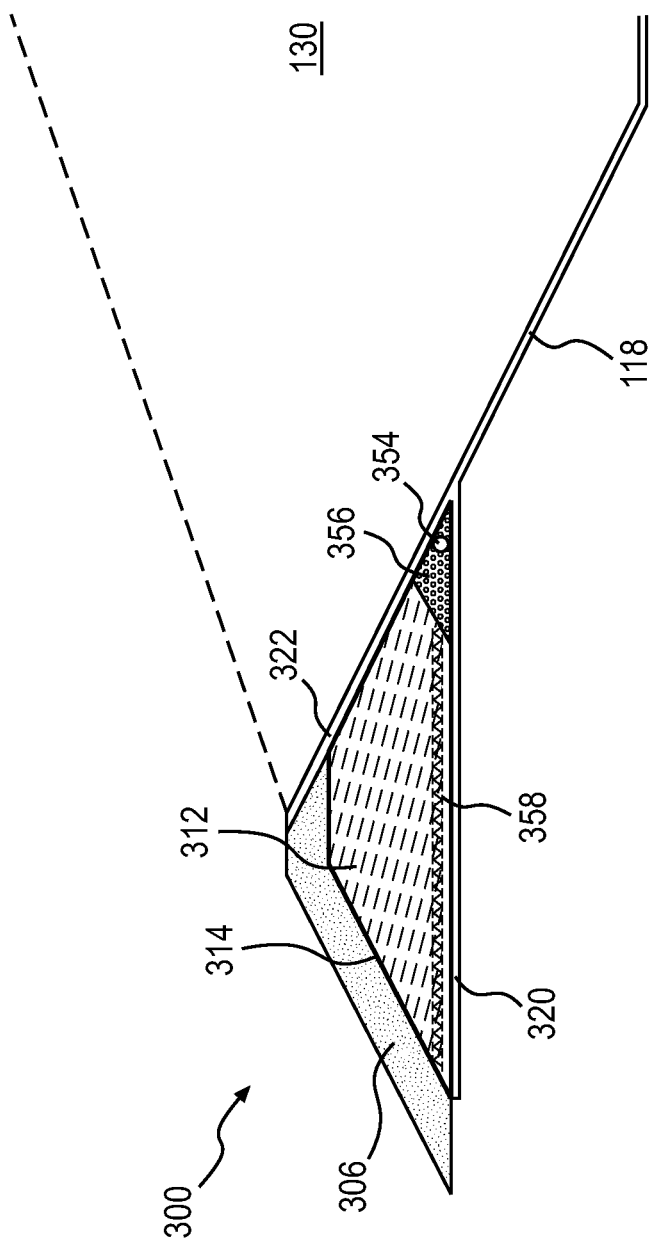
FIG. 14 is a simplified cross-sectional diagram of a berm for creating a landfill or laterally increasing the capacity of an existing landfill, in accordance with an alternative embodiment of the present invention.
Figure 15:
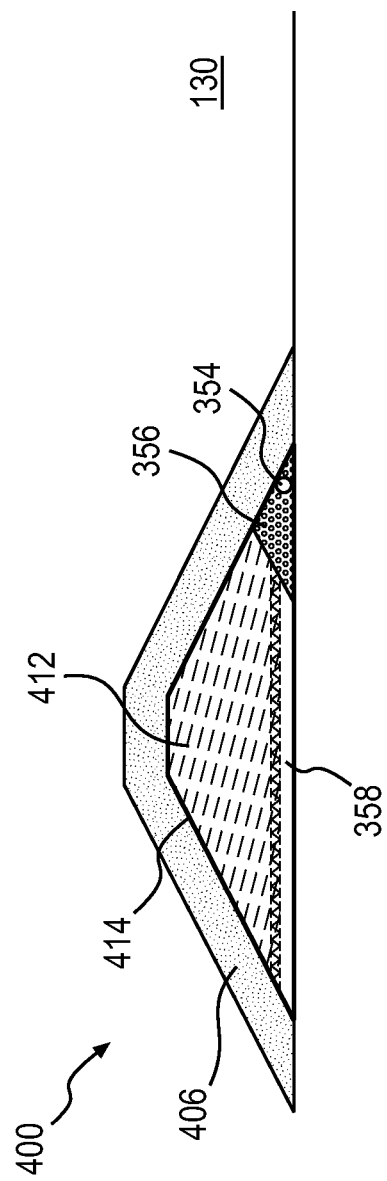
FIG. 15 is a simplified cross-sectional diagram of a berm, in accordance with an alternative embodiment of the present invention.

FIGS. 13-15 illustrate berms of alternative embodiments of the invention. The berms of FIGS. 13-15 function similarly to the berms of FIGS. 1-12 in that the berms of FIGS. 13-15 can be used to increase the capacity of an existing landfill. However, the berms of FIG. 13-15 have a different cross-sectional shape than the berms of FIGS. 1-12. Additionally, the berms of FIG. 13-15 do not have a reinforced portion, although the berms of FIGS. 13-15 have structural fill that could optionally be reinforced in a manner similar to that of the reinforced portions of the berms of FIGS. 2-12 or in any suitable manner. The berms of FIGS. 13-15 have an overall cross-sectional shape that is substantially an equilateral trapezoid. Additionally, the backfill material of the berms of FIGS. 13-15 has a cross-sectional shape that is substantially an equilateral trapezoid. The backfill material of the berms of FIGS. 13-15 is fully encapsulated by an impermeable membrane.

Referring now to FIG. 13, a simplified cross-sectional diagram of a berm for increasing the capacity of an existing landfill is illustrated in accordance with an alternative embodiment of the present invention. The berm 300 of FIG. 13 comprises backfill material 312 fully encapsulated by an impermeable membrane 314 (such as a geomembrane as described above). The sloped front face (the surface opposite the waste) and the top surface of the backfill material are covered by a protective covering 306 of structural fill material (which may or may not be reinforced). The berm sits on the edge surface of the landfill, thereby creating space for a future accumulation of waste 130 above the existing accumulation of waste 20. The berms of FIGS. 13-15 may have an optional drainage system similar to that of the berms of FIGS. 3-6 (the drainage system is an optional feature of all of the berms). The drainage system of the berm of FIG. 13 comprises a perforated pipe 354 running along at least a portion of the length of the berm. The pipe 354 is surrounded by a granular fill material 356. An optional plurality of drainage pipes (not illustrated) may each lead substantially perpendicularly from the perforated pipe toward the face and to an area outside of the berm. Each of the plurality of drainage pipes typically pass through the impermeable membrane via a corresponding boot that is joined to the impermeable membrane and to the corresponding drainage pipe with impermeable seams. A drainage layer 358 may be adjacent the inside surface of the lower sloped outer surface of the impermeable membrane, terminating on one side within the granular fill material. The drainage layer, which may comprise a geocomposite, helps channel any water toward the granular fill and the perforated pipe.

In the embodiment of FIG. 13, a first liner portion 320 is disposed between the bottom surface and at least a portion of the edge surface and a second liner portion 322 is disposed between the berm and the future accumulation of waste 130. The first and second liner portions will typically conform to Subtitle D of RCRA or conform to an approved equivalent of Subtitle D of RCRA. As discussed above, if the first and/or second liner portions comprise a Subtitle D or equivalent liner that has a geomembrane layer, the geomembrane that encapsulates the backfill material may function additionally as the geomembrane layer of the Subtitle D or equivalent liner. Also as discussed above, the Subtitle D or equivalent liner may be omitted and a geomembrane by itself used in place of the Subtitle D or equivalent liner if permitted by the appropriate governmental authorities. The embodiments of FIGS. 13-15 may be used with a landfill with no liner system in place (see FIG. 13) or with a landfill that has a Subtitle D or equivalent liner 118 covering the surface of the waste-receiving recess (see FIG. 14).

A berm according to embodiments of the present invention may be used to create a new landfill by constructing one or more such berms around the desired perimeter of the new landfill. In such an alternative embodiment, the one or more berms define and create the waste-receiving recess of the landfill. This is illustrated in FIGS. 14 and 15. FIG. 14 illustrates a berm situated adjacent a hole in the ground such that the berm increases the effective size of the waste-receiving recess. The berm of FIG. 14 may be useful if conditions at the landfill location prevent the hole from being dug deep enough to create a desired sized recess. FIG. 15 illustrates a berm situated adjacent a substantially horizontal ground surface such that the berm creates/defines the entire waste-receiving recess. The berm of FIG. 15 may be useful if conditions at the landfill location prevent any hole from being dug to create the desired recess.

Referring now to FIG. 14, a simplified cross-sectional diagram of a berm for creating a landfill or laterally increasing the capacity of an existing landfill is illustrated in accordance with an alternative embodiment of the present invention. The berm of FIG. 14 is identical to that of FIG. 13 except that the berm of FIG. 14 is being used to create a new landfill or laterally expand an existing landfill. Thus, the berm of FIG. 14 is not situated adjacent an existing accumulation of waste but rather is situated adjacent an empty recess or laterally apart from an existing accumulation of waste.

Referring now to FIG. 15, a simplified cross-sectional diagram of a berm is illustrated in accordance with an alternative embodiment of the present invention. The berm 400 of FIG. 15 may be used, for example, as a roadway embankment. The berm 400 of FIG. 15 is similar to that of FIGS. 13 and 14, but the backfill material 312 of the berm 400 of FIG. 15 is covered by a protective covering 406 of structural fill material on the top surface and both sloped surfaces.

In addition to use for increasing the capacity of an existing landfill or creating a new landfill, the berms of embodiments of the invention may be used for any purpose typically accomplished by prior art berms. For example, the berms of embodiments of the invention may be used for roadway barriers or levees. The berm 400 of FIG. 15 may be particularly suited for non-landfill purposes, such as for creating a levee.

Some or all of the protective covering of any of the berms of FIGS. 13-15 may be topped with concrete or any other suitable material to increase the structural strength of the berm and/or to help maintain the structural fill material in place.

Figure 16:
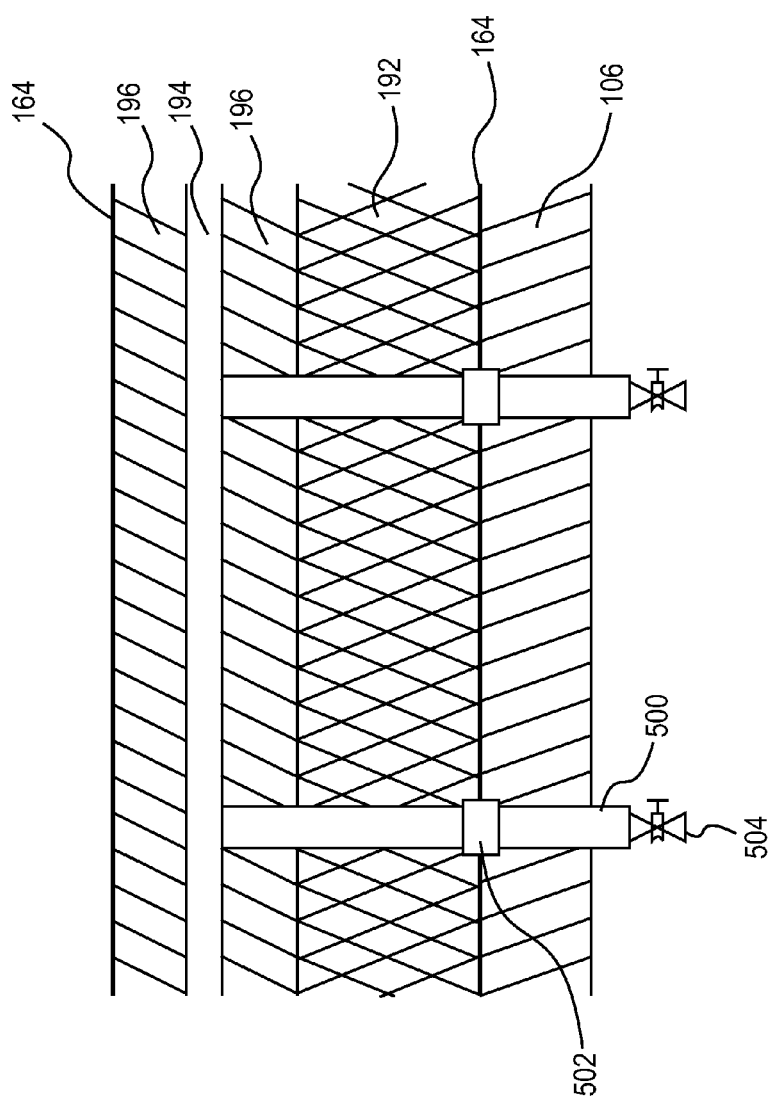
FIG. 16 is a partial top cutaway view of a drainage system of a berm for increasing the capacity of an existing landfill, in accordance with embodiments of the present invention.

Referring now to FIG. 16, a partial top cutaway view of an optional drainage system of a berm is illustrated in accordance with embodiments of the present invention. FIG. 16 illustrates one possible embodiment of the drainage system of the berm of FIG. 5, however the drainage systems of the other illustrated berms of embodiments of the invention may be similar to that illustrated in FIG. 16. Many different drainage system configurations may be used in various embodiments of the invention. FIG. 16 illustrates the perforated pipe 194 running along the length of the berm within the impermeable membrane 164. The perforated pipe is surrounded by a granular fill material 196. A plurality of drainage pipes 500 (two are illustrated) each lead substantially perpendicularly from the perforated pipe toward the face through the backfill material 192 and the structural fill 106 and to an area outside of the berm. Each of the plurality of drainage pipes typically exits the impermeable membrane through a corresponding boot 502 that is joined to the impermeable membrane and to the corresponding drainage pipe with impermeable seams. The terminal end of each drainage pipe will typically have a valve 504 to control the flow of any infiltrated water out of the drainage system. Additionally or alternatively, fluid monitoring devices may be placed at the terminal end of each drainage pipe.

Figure 17A:
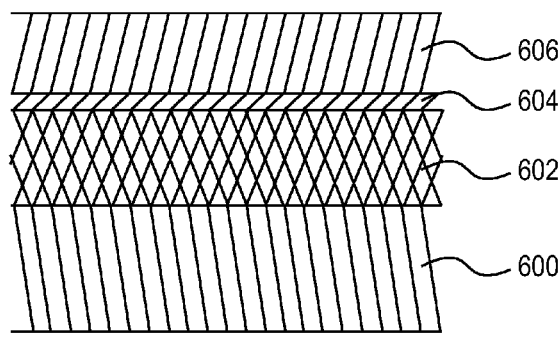
FIGS. 17A-C illustrate simplified cross-sectional diagrams of a Subtitle D landfill liner and two possible equivalents thereof.
Figure 17B:
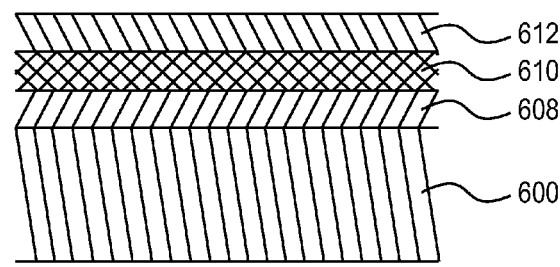
Figure 17C:
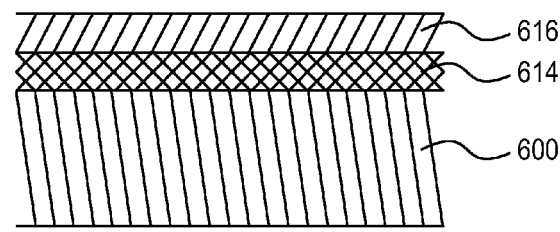

FIG. 17 illustrates simplified partial cross-sectional diagrams of a Subtitle D landfill liner and two equivalents thereof. FIG. 17A illustrates the layers of a Subtitle D liner. Layer 600 is the subgrade. Layer 602 is two feet of clay with a specified permeability. Layer 604 is a geomembrane (typically a 60 mil HDPE geomembrane). Layer 606 is eighteen inches of coarse granular material (e.g., aggregate or sand). FIG. 17B illustrates the layers of a liner that is typically considered to be equivalent to a Subtitle D liner. Layer 600 is the subgrade. Layer 608 is a geosynthetic clay liner (GCL). Layer 610 is a geomembrane (typically a 60 mil HDPE geomembrane). Layer 612 is either a geocomposite or eighteen inches of coarse granular material (e.g., aggregate or sand). FIG. 17C illustrates the layers of a liner that is typically considered to be equivalent to a Subtitle D liner. Layer 600 is the subgrade. Layer 608 is a geomembrane laminated geosynthetic clay liner. Layer 616 is either a geocomposite or eighteen inches of coarse granular material (e.g., aggregate or sand).

Construction of a berm according to embodiments of the invention generally begins with site improvements, infrastructure relocation, and subgrade preparation. Depending on site conditions, improvements of leachate and/or gas collection systems may be required prior to construction of the berm. Decommissioning and/or relocation of monitoring wells, gas probes, water/sewer lines, communications and/or electricity cables, stormwater features, and other appurtenances may be necessary. This work will generally be performed prior to subgrade preparation. The existing subgrade along the berm footprint may require cut/fill in order to bring existing grades to the proposed base grade elevations, as specified in the construction drawings. Depending on the foundation conditions, foundation improvements (e.g., deep soil mixing, soil columns) may be required prior to construction of the berm.

To construct the berm, clean structural fill with parameters provided by a design engineer shall be used in the reinforced portion of the berm. Suitable contaminated backfill material (as described above) is be used in the non-reinforced portion of the berm. To facilitate uniform compaction of both the structural fill and the backfill material, the construction of the berm shall typically be carried out in the following steps:

1. Place and compact 1.5 foot thick lifts of structural fill as specified in the construction drawings with baskets on the face of the berm.
2. Each basket shall have a welded wire form along the face of the berm to allow for top soil placement and facing construction.
3. A layer of 1.5 feet of structural fill shall be placed over a layer of geogrid (the geogrid is used as the reinforcing members).
4. A wrap geotextile is typically wrapped around the face to prevent topsoil from eroding before vegetation is established.
5. The structural fill shall extend from the wall facing to at least the specified length of the geogrid, from where it ties in to the existing surface on a 2:1 (horizontal:vertical) slope.
6. Typically, four 1.5 foot thick lifts shall be installed following steps 1-5. Depending on the configuration of the wall at a specific site, fewer lifts may be constructed at a given time but, typically, no more than four lifts will be constructed in one sequence.
7. Install the impermeable membrane (e.g., geomembrane) along the 2:1 (horizontal:vertical) slope to allow for separation between structural fill and CCBs.
8. Place backfill material in 12 inch lifts to match the total thickness of the structural fill (typically 6 feet).
9. Weld the geomembrane, flip the geomembrane over the backfill material layer, and extend to the next structural fill/backfill material tie-in point.
10. Construct the next lifts of structural fill as outlined in steps 1-6.
11. Repeat the backfill material construction procedure outlined in Steps 7-9.
12. Repeat steps 10 and 11 until the berm is complete.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A combination of an existing landfill and a berm to increase capacity of the existing landfill, the landfill comprising a waste-receiving recess having a surface and an outer perimeter, an edge surface peripherally adjacent at least a portion of the outer perimeter, and an existing accumulation of waste within the recess having a collective top surface, the berm comprising:
    a reinforced portion having opposing inner and outer surfaces and comprising structural fill material and a plurality of reinforcing members disposed therein; and
    backfill material having an inner surface adjacent the inner surface of the reinforced portion, the backfill material being at least partially encapsulated by a fluid-impermeable membrane;
    wherein at least a portion of the berm sits on at least a portion of the edge surface of the landfill;
    wherein the inner surface of the reinforced portion and the adjacent inner surface of the backfill material are substantially non-planar, and
    wherein the inner surface of the reinforced portion and the adjacent inner surface of the backfill material each comprise a plurality of interlocking sections.

2. The combination of claim 1, wherein the backfill material comprises contaminated fill material;
    wherein the contaminated fill material comprises one or more of fossil fuel combustion product, fly ash, bottom ash, boiler slag, flue gas desulphurization material, nonhazardous contaminated soil, contaminated crushed glass, contaminated crushed concrete, contaminated crushed asphalt, sand blast grit, foundry sand, dewatered dredge spoils, or combinations thereof; and wherein the contaminated fill material is contaminated with one or more of a metal, an acid, a base, a volatile organic compound, a semi-volatile organic compound, a petroleum product, selenium, mercury, lead, boron, cadmium, thallium, a polycyclic aromatic hydrocarbons compound, or combinations thereof.

3. The combination of claim 1, wherein the impermeable membrane comprises a geomembrane.

4. The combination of claim 3, wherein the geomembrane comprises one of low-density polyethylene (LDPE), high-density polyethylene (HDPE), polyvinyl chloride (PVC), polyurea or polypropylene (PP).

5. The combination of claim 1, wherein the impermeable membrane comprises a plurality of impermeable membrane sections joined with impermeable seams.

6. The combination of claim 1, wherein any unencapsulated portion of the backfill material is adjacent the existing accumulation of waste.

7. The combination of claim 1, wherein the backfill material is fully encapsulated.

8. The combination of claim 7, further comprising:
a drainage system in the backfill material and within the impermeable membrane.

9. The combination of claim 8, wherein the drainage system comprises a perforated pipe surrounded by a granular fill material.

10. The combination of claim 9, wherein the drainage system further comprise at least one drainage pipe leading from the perforated pipe to an area outside of the berm.

11. The combination of claim 8, further comprising:
a drainage layer adjacent an inner surface of the impermeable membrane and contacting the drainage system.

12. The combination of claim 11, wherein the drainage layer comprises a geocomposite.

13. The combination of claim 7, wherein the backfill material further comprises opposing top and bottom surfaces, and upper and lower sloped outer surfaces; and
wherein the lower sloped outer surface slopes outward and upward from the bottom surface to the upper sloped outer surface, wherein the upper sloped outer surface slopes outward and downward from the top surface to the lower sloped outer surface, wherein the lower sloped outer surface is adjacent the existing accumulation of waste, and wherein the upper sloped outer surface is adapted to be adjacent a future accumulation of waste.

14. The combination of claim 13, further comprising:
a first liner portion disposed between the bottom surface and at least a portion of the edge surface; and
a second liner portion adapted to be disposed between the upper sloped outer surface and the future accumulation of waste.

15. The combination of claim 14, further comprising:
a third liner portion disposed between the lower sloped outer surface and the existing accumulation of waste.

16. The combination of claim 7, wherein the backfill material further comprises opposing top and bottom surfaces, and a sloped outer surface;
wherein the sloped outer surface slopes outward and downward from the top surface to the bottom surface, and wherein the sloped outer surface is adapted to be adjacent a future accumulation of waste.

17. The combination of claim 16, further comprising:
a first liner portion disposed between the bottom surface and at least a portion of the edge surface; and
a second liner portion adapted to be disposed between the sloped outer surface and the future accumulation of waste.

18. The combination of claim 1, wherein the plurality of interlocking sections have a zigzag configuration.

19. A combination of a new or an existing landfill and a berm to create the new landfill or to laterally expand the existing landfill by defining a waste-receiving area at a desired location, the waste-receiving area having a surface and an outer perimeter, and the desired location having an edge surface peripherally adjacent at least a portion of the outer perimeter, the berm comprising:
a reinforced portion having opposing inner and outer surfaces and comprising structural fill material and a plurality of reinforcing members disposed therein; and
backfill material having an inner surface adjacent the inner surface of the reinforced portion, the backfill material being at least partially encapsulated by a fluid-impermeable membrane;
wherein at least a portion of the berm sits on at least a portion of the edge surface;
wherein the inner surface of the reinforced portion and the adjacent inner surface of the backfill material are substantially non-planar, and
wherein the inner surface of the reinforced portion and the adjacent inner surface of the backfill material each comprise a plurality of interlocking sections.

20. The combination of claim 19, wherein the backfill material comprises contaminated fill material;
wherein the contaminated fill material comprises one or more of fossil fuel combustion product, fly ash, bottom ash, boiler slag, flue gas desulphurization material, nonhazardous contaminated soil, contaminated crushed glass, contaminated crushed concrete, contaminated crushed asphalt, sand blast grit, foundry sand, dewatered dredge spoils, or combinations thereof; and
wherein the contaminated fill material is contaminated with one or more of a metal, an acid, a base, a volatile organic compound, a semi-volatile organic compound, a petroleum product, selenium, mercury, lead, boron, cadmium, thallium, a polycyclic aromatic hydrocarbons compound, or combinations thereof.

21. The combination of claim 19, wherein the impermeable membrane comprises a geomembrane.

22. The combination of claim 19, wherein the impermeable membrane comprises a plurality of impermeable membrane sections joined with impermeable seams.

23. The combination of claim 19, wherein any unencapsulated portion of the backfill material is adapted to be adjacent a future accumulation of waste.

24. The combination of claim 19, wherein the backfill material is fully encapsulated.

25. The combination of claim 24, further comprising:
a drainage system in the backfill material and within the impermeable membrane.

26. The combination of claim 25, wherein the drainage system comprises a perforated pipe surrounded by a granular fill material.

27. The combination of claim 26, wherein the drainage system further comprise at least one drainage pipe leading from the perforated pipe to an area outside of the berm.

28. The combination of claim 25, further comprising:
a drainage layer adjacent an inner surface of the impermeable membrane and contacting the drainage system.

29. The combination of claim 28, wherein the drainage layer comprises a geocomposite.

30. The combination of claim 24, wherein the backfill material further comprises opposing top and bottom surfaces, and a sloped outer surface;
  wherein the sloped outer surface slopes outward and downward from the top surface to the bottom surface, and wherein the sloped outer surface is adapted to be adjacent a future accumulation of waste.

31. The combination of claim 30, further comprising:
  a first liner portion disposed between the bottom surface and at least a portion of the edge surface; and
  a second liner portion adapted to be disposed between the sloped outer surface and the future accumulation of waste.

32. The combination of claim 19, wherein the plurality of interlocking sections have a zigzag configuration.

* * * * *